March 27, 1951      A. KOENIG      2,546,453
ADJUSTABLE TRACTOR WHEEL MEANS
Filed June 9, 1947      2 Sheets-Sheet 1
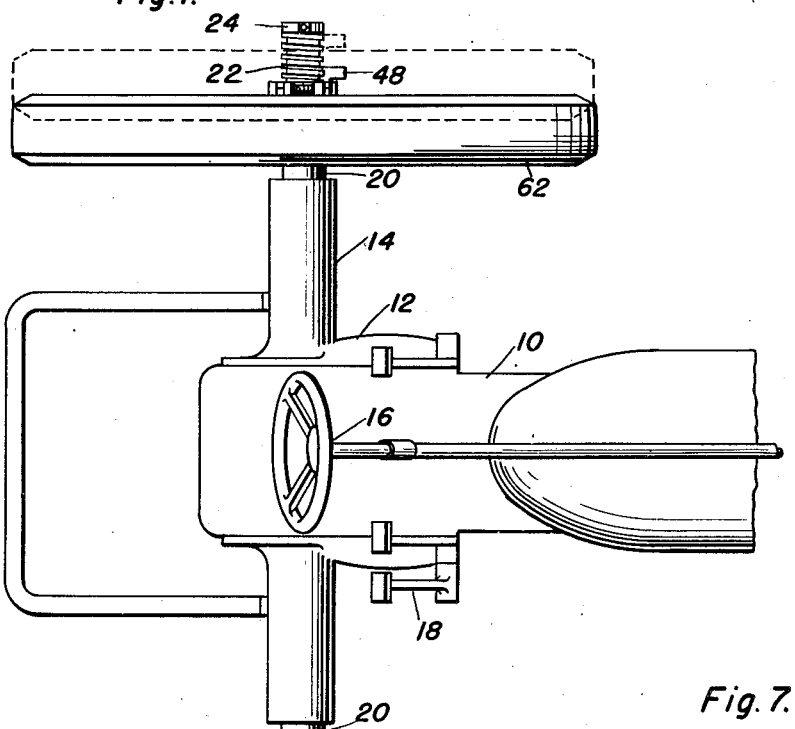
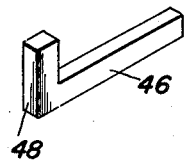
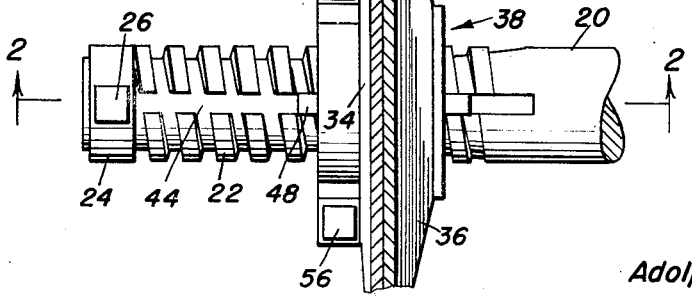
Inventor
Adolph Koenig

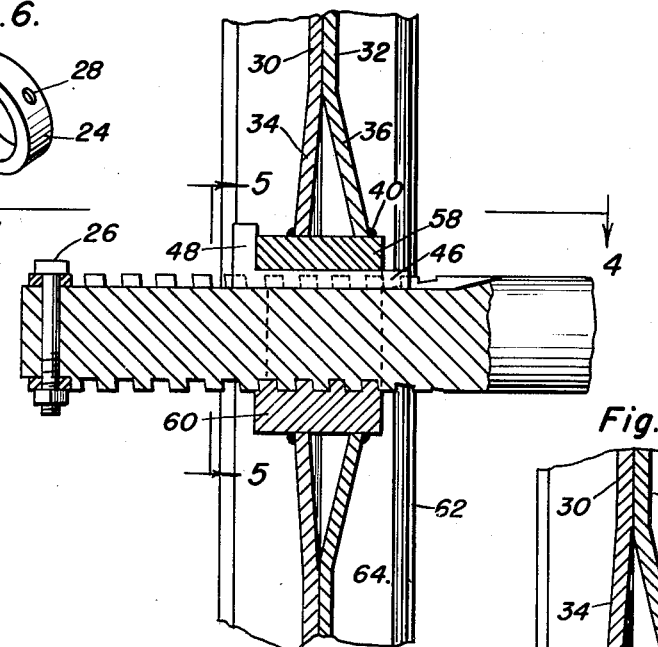
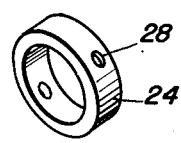
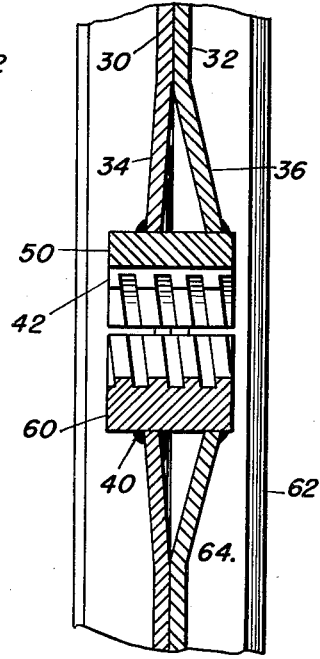
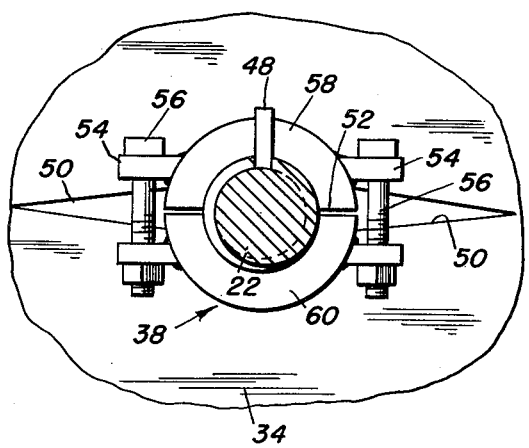

Patented Mar. 27, 1951

2,546,453

UNITED STATES PATENT OFFICE 2,546,453

ADJUSTABLE TRACTOR WHEEL MEANS

Adolph Koenig, Montpelier, N. Dak.

Application June 9, 1947, Serial No. 753,522

4 Claims. (Cl. 287—52.05)

This invention relates generally to tractor wheels and axles, and more particularly to an adjustable tractor wheel mounting means comprising an axle which is terminally screw threaded, and wheels having correspondingly threaded hubs to allow movement of the wheels longitudinally of the axle, together with means to lock the wheels and the axle against relative rotation or movement.

It is a primary object of this invention to provide means for adjusting the wheels of a tractor longitudinally of the axle in order that the spacing of the wheels may be made to correspond with the distance between rows of different crops when the tractor is used in planting, cultivating and harvesting such crops.

It is another object of this invention to provide means of this character in which the tractor power may be used to force the wheels further apart or nearer together, after the wheel locking means has been released, whereafter the wheel locking means is again clamped to prevent further relative rotational movement between the hubs and the axle.

A still further object of this invention is to provide a novel means of effecting the releasable locking of the hubs on the axle, including the provision of a split hub integrally secured to each of the wheels which are divided along a diametrically disposed line adjacent said hub, the split in the hub registering with the line of division or recessed portion of the wheel.

Another salient object of this invention is to provide means to prevent the wheels from completely leaving the axle.

And a last object to be specifically mentioned is to provide a device of this character which is relatively inexpensive and practicable to manufacture, extremely simple and convenient to incorporate in a tractor during original manufacture thereof and also very easily applied to a tractor not originally fitted therewith, and which is generally efficient and durable in service.

With these objects definitely in view, this invention resides in certain novel features of construction, combination and arrangement of parts and portions as will be hereinafter described in detail in the specification, particularly pointed out in the claims appended, and illustrated in the accompanying drawings which form a material part of this application, and in which:

Figure 1 is a top plan view of the rear portion of the tractor with this invention incorporated therewith;

Figure 2 is an enlarged detail fragmentary view of a portion of a wheel with an axle and hub designed according to this invention, the view being taken substantially on the line 2—2 in Figure 4 and the major portions of the elements depicted therein being illustrated in vertical sections;

Figure 3 is a similar view of a portion of a wheel with the axle and key removed;

Figure 4 is a fragmentary elevational view of a wheel having a split hub and a threaded axle operatively associated therewith;

Figure 5 is a perspective view of the collar used as wheel stop means on the outer end of the axle;

Figure 6 is a perspective view of the locking key; and

Figure 7 is a view, in perspective, of one of the feathers used in connection with the splined axis.

Similar characters of reference designate similar or identical parts and portions throughout the specification and throughout the several views of the drawings.

Referring now to the drawings in detail, it will be noted that the environment wherewith this invention is adapted to be used includes a tractor having a frame 10, gear housing 12, axle housing 14, together with the novel complement of steering apparatus 16 and foot control apparatus 18. The tractor axle 20, ordinarily comprised of two similar parts on the different sides of the housing 12, is provided with a screw threaded portion 22, a substantially square section thread being illustrated as a preferred type for use in this invention.

The parts on either side of the tractor, that is, on either end of the axle 20, are substantially similar except that the thread 22 will be reversed on the two parts, in order that movement of the tractor under power will cause the wheels to diverge or to approach each other when these wheels are made free to turn on the threaded portions of the axle or axles 20. It will be understood that even when the locking means hereinafter described is loosened so that the wheels may turn freely on the axles, a certain amount of traction is still preserved partly by reason of the side thrust produced by the action of the threads. The result of this partial or impaired traction is that the tractor power can be used to slowly and accurately adjust the wheels, it being understood that such partial traction is not completely necessary and that the tractor power may be used to force the wheels in either direction longitudinally of the axles, without rotation of the wheels or movement of the tractor over the ground.

In order that the device may be adjusted by tractor power with complete safety, a collar 24 is substantially permanently secured to the outer end of the axle by means of bolts 26 inserted through holes 28 in the collar and through a diametrically disposed aperture in the end of each axle 20. The wheels may be of any suitable character, the drawings illustrating a wheel comprised of a bevelled disc 30 and 32 and construction in which the portions 34 and 36 adjacent the hub 38 are flanged or bent outwardly and secured, as by welding at 40, to the hub 38. This hub is interiorly screw-threaded to correspond with the exteriorly threaded portions 22 of the axles and the hub and the portions 22 are provided with key ways 42 and 44, respectively, to receive the shank portion 46 of a locking key 48. This key 48 will ordinarily be slightly tapered and will provide the main locking means preventing relative rotational movement between the axle and the hubs 38.

The wheels, that is, the portions 34 and 36, as well as portions of the disc parts 30 and 32 are parted or triangularly recessed as illustrated best in Figure 5 at 50. The hub 38 is also split as at 52 and flanges 54 are welded on the disc portions on each side of the division or recess 50, these flange portions 54 being recessed at the ends to receive clamping bolts 56 whereby arcuate portions 58 and 60 of the hub 38 are clamped together to grip tightly upon the threaded portions 22 of the axle, these elements also serving to tightly clamp the key 46 in position. The wheels of such tractors are ordinarily equipped with pneumatic tires 62 mounted on rims 64 and the movement of the wheels so as to increase and decrease the distance between these wheels will be clearly understood when reference is had to Figure 1 in which two positions of the tires 62 are illustrated.

The operation of this invention will be clearly understood from the foregoing description of the mechanical details thereof, taken in connection with the above recitation of the objects sought to be achieved by this invention, but in recapitulation, it will be noted that turning of the axles 20 under tractor power may be conveniently used to cause the wheels to approach or diverge, the collars 24 will prevent the wheels from being completely removed from the axle, and the dividing of the discs of the wheels will be seen to provide for a novel clamping action between the wheels and the axles.

It will be noted that this invention is not limited to application to any particular type of wheel, axle or axle mounting and that the principle of dividing the disc portion of the wheel may be applied to wheels having spoke construction, all within the spirit and scope of this invention. In spoke wheels the hub may be divided and flanges corresponding to the flanges 54 described above may be secured to the two portions of each split hub and the invention reduced to practice in a manner corresponding exactly with the means described above.

Though there have been described embodiments of this invention, this application is not limited to these particular embodiments herein illustrated, but it is desired to include in the scope of this invention the construction, combination and arrangement of parts and portions substantially as set forth in the appended claims.

Having described the invention, what is claimed as new is:

1. Tractor wheel mounting means comprising a terminally screw threaded axle, a wheel comprising a disc having a split hub interiorly correspondingly screw threaded to allow adjustment of the wheel longitudinally of the axle, said hub extending axially beyond said disk, opposing pairs of flanges on said hub and clamping bolts connecting each pair of flanges to lock said hub and axle against relative rotational movement, said disc being divided substantially colinearly with the line of division in said split hub throughout a portion thereof adjacent said hub.

2. Tractor wheel mounting means comprising a terminally screw threaded axle, a wheel comprising a disc having a split hub interiorly correspondingly screw threaded to allow movement of the wheel longitudinally of the axle, and releasable means to lock said hub and axle against relative rotational movement, said disc being divided substantially colinearly with the line of division in said split hub throughout a portion thereof adjacent said hub, and said means comprising pairs of opposing apertured flanges integral with said hub and threaded elements comprising bolts each having a head at one end and a nut at the other end, said heads and nuts exteriorly engaging said flanges, said threaded elements spanning said pairs of flanges and collapsing said hub into engagement with said axle, and registering keyways in said axle and hub, and a key in said keyways.

3. Tractor wheel mounting means comprising a terminally screw threaded axle, a wheel having a correspondingly threaded hub, registering keyways in said axle and hub, a key removably inserted in said keyways and removable stop means on the end of said axle to prevent the wheel from being inadvertently driven off said axle.

4. Tractor wheel mounting means comprising a terminally screw threaded axle, a wheel having a correspondingly threaded hub, registering keyways in said axle and hub, a key removably inserted in said keyways and stop means on the end of said axle, said hub being split, and means to releasably clamp said split hub on said axle to fasten said key in said keyways.

ADOLPH KOENIG.

REFERENCES CITED

The following references are of record in the file of this patent:

UNITED STATES PATENTS

| Number | Name | Date |
|---|---|---|
| 404,824 | Clark | June 11, 1889 |
| 1,025,264 | Gilbert | May 7, 1912 |
| 1,326,846 | Clark et al. | Dec. 30, 1919 |
| 2,324,681 | Dekker | July 20, 1943 |